June 24, 1958  D. E. BRANDT, JR., ET AL  2,840,343
REDUCTION OF ROTATING TIP CLEARANCE
USING SEGMENTED WEAR STRIPS
Filed Oct. 14, 1955

INVENTOR.
DAVID E. BRANDT, JR.
DAVID P. FRASER
FREDERIC D. SEAMAN
BY
ATTORNEYS

United States Patent Office 2,840,343
Patented June 24, 1958

2,840,343

REDUCTION OF ROTATING TIP CLEARANCE USING SEGMENTED WEAR STRIPS

David E. Brandt, Jr., Derbyshire, England, David R. Fraser, Prairie Village, Kans., and Frederic D. Seaman, Kansas City, Mo., assignors, by mesne assignments, to the United States of America as represented by the Secretary of the Navy Application October 14, 1955, Serial No. 540,654

1 Claim. (Cl. 253—77)

This invention relates to high speed rotary devices, such as compressors or turbines; more specifically to apparatus wherein the tip clearance between the rotary element and the housing may be reduced to a minimum thereby increasing the efficiency of the particular work unit.

An object of our invention is to provide an apparatus whereby the tip clearance of a rotary machine can be automatically provided for.

A secondary object of my invention is to provide a structure wherein tip clearance of rotating elements may be kept at high efficiency through the use of segmented housing sections.

A further object of our invention is a method and apparatus of bonding wear-away material to a lining of a high speed engine thereby instituting a saving in highly critical and expensive materials.

Other objects and many of the attendant advantages of this invention will be readily appreciated as the same becomes better understood by reference to the following detailed description when considered in connection with the accompanying drawing wherein:

In high speed rotary devices, such as turbines and compressors, tip clearance between the rotating elements of the device and the inner diameter of the housing has been so large as to create a loss of efficiency of approximately 3%. This clearance is a necessary design factor, however, in order to allow for tip diameter increases due to thermal and centrifugal loads or the sudden application of maneuver loads.

Figure 1:
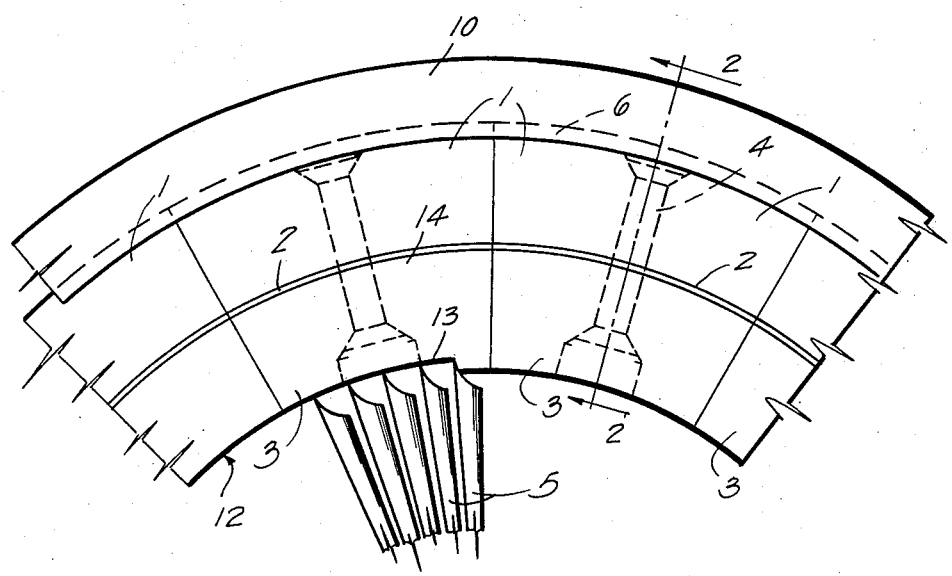
Figure 1 is an elevational view of a portion of a device utilizing the invention.

In the drawing, 10 depicts the usual hollow housing of a turbine or similar device to the inner surface of which is attached a laminated liner, indicated generally as 12. A rotor having a plurality of circumferentially disposed and radially extending blades, some of which are shown at 5, is mounted for rotation in housing 10 for sealing engagement of the free ends of the blades 5 with the inner surface 13 of the liner 12.

The liner 12 is composed of a number of interchangeable, laminated, arcuate segments 14, each of which is similar in shape and size, that are arranged to form a continuous ring. Each segment has an outer liner element 1 and a removable wear-away surface or inner element 3 which effect a laminated structure of concentric layers of materials in the liner 12 when the segments are arranged annularly. As illustrated, segments 14 are portions of a laminated, cylindrical tube subtended by radial planes.

Figure 3:
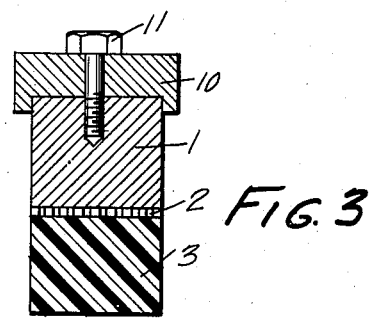
Figure 3 is a view similar to Figure 2 of a modification showing a plastic material inner liner element.

To secure the liner 12 to the housing 10, the elements 1 are set in a groove, as at 6, on the inner surface of the rotor housing 10. The element 1 may also be fastened to the housing by bolts 11 (Fig. 3) or other similar fasteners so that it may be easily replaced in the engine.

A wear-away surface or innermost liner element 3 is secured to the inner face of the element 1. As illustrated in Figure 1 to the right of blades 5, the inner diameter of the surface 13 is originally less than the outer diameter of the rotating elements 5. The latter elements may be either the blades of the rotor of the compressor or of the turbine.

In operation, since the tip diameter of the rotating element is greater than the inner diameter of the wear-away surface, there is an initial no-clearance engagement therebetween, but the rotating element rubs away part of the inner surface until the proper diameter of the inner liner is reached. In this way the clearance between the tips of the rotors and the wear-away surface or inner liner is kept at a minimum value to insure high efficiency.

Not only does the wear-away surface provide the proper diameter, but it also provides for a less critical and less expensive material to be used as a liner.

Figure 2:
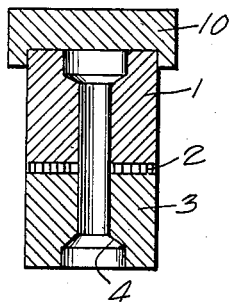
Figure 2 is a sectional view taken along the line 2—2 of Figure 1 showing the use of a metallic inner liner element.

For turbine applications, a material for the wear-away liner such as Minnesota Mining Co. High Temperature Sealer (EC1137) was found to be suitable; in compressor applications, suitable plastic materials (see Fig. 3) were Kel–F, Teflon, Micarta plastics and plastic laminates while metals (Fig. 2) such as magnesium and aluminum are also adaptable. Other materials may be found to be suitable for the purpose disclosed; it is of course understood that for turbine applications, the materials must be able to withstand the severe operating conditions brought on by the high temperature of the gases. In addition, the materials of element 3 may be selected from a viewpoint of protection of the element 1 from such operation hazards as salt water corrosion and high temperature oxidation.

The wear-away surface 3 may be secured to the outer liner element 1 in any number of ways. Some suggested methods are (a) by the use of a commercial bonding resin 2 (e. g. M–8859–5 or any of the "Cycle-weld" cements) which cements the surfaces of elements 1 and 3 together, (b) by utilizing a chemical treatment (e. g. anodizing or phosphate coating), (c) by mechanical fasteners (e. g. rivets 4 in the Figure 1 or locking grooves), or (d) a combination of any of the above.

As illustrated by the drawing, the liner segments are of equal size and shape and obviously interchangeable with each other. With the use of such segments, easy replacement may be made of any particular section in the event any local stress condition in the housing or sudden maneuver load caused excessive wear or damage on the inner circumference of the liner. Use of such segments also facilitates ready curing of the sections in the bonding process. It is also apparent that the outer elements 1 are similar in size and shape and interchangeable with each other as are the inner liner elements 3.

Obviously many modifications and variations of the present invention are possible in the light of the above teachings. It is therefore to be understood that within the scope of the appended claim the invention may be practiced otherwise than as specifically described.

What is claimed is:

In a rotating machine having a rotor with a plurality of circumferentially disposed radially extending blades, a housing surrounding said rotor having an inner surface closely spaced with the free ends of said blades, and a lining carried on the inner surface of said housing having concentric layers of material including an inner wear surface in operative relation with said free ends of said blades; said lining comprising a ring of arcuate segments, each of said segments having an outer element of one material and an inner element of softer wear material, and means removably securing said inner and outer elements together; each of said segments being similar in size and shape and interchangeable with each other; said inner surface of said lining initially having no radial clearance with said free ends of said blades, and said blades wearing away excess material during their rotation.

References Cited in the file of this patent

UNITED STATES PATENTS

| | | |
|---|---|---|
| 953,674 | Westinghouse | Mar. 29, 1910 |
| 1,033,237 | De Ferranti | July 23, 1912 |
| 1,424,242 | Flanders | Aug. 1, 1922 |
| 2,336,323 | Warren | Dec. 7, 1943 |
| 2,742,224 | Burhans | Apr. 17, 1956 |

FOREIGN PATENTS

| | | |
|---|---|---|
| 572,059 | Great Britain | Sept. 20, 1945 |
| 733,918 | Great Britain | July 20, 1955 |